(12) United States Patent
McCarthy

(10) Patent No.: US 6,181,941 B1
(45) Date of Patent: Jan. 30, 2001

(54) METHOD OF INTEGRATING HANDOFF QUEUING WITH ADAPTIVE HANDOFF RESERVE CHANNELS

(75) Inventor: Michael John McCarthy, University Park, TX (US)

(73) Assignee: Nortel Networks Corporation, Montreal (CA)

( * ) Notice: Under 35 U.S.C. 154(b), the term of this patent shall be extended for 0 days.

(21) Appl. No.: 08/899,353

(22) Filed: Jul. 23, 1997

(51) Int. Cl.$^7$ ..................................................... H04B 1/06
(52) U.S. Cl. ........................ 455/436; 455/437; 455/438; 455/439; 455/524
(58) Field of Search ..................................... 455/436, 450, 455/452, 437, 453, 524, 525, 438, 439

(56) References Cited

U.S. PATENT DOCUMENTS

| | | | |
|---|---|---|---|
| 3,764,915 | * 10/1973 | Cox et al. | 325/53 |
| 5,437,056 | * 7/1995 | Rautiola | 455/34.1 |
| 5,530,912 | * 6/1996 | Agrawal et al. | 455/33.2 |
| 5,862,485 | * 1/1999 | Linneweh, Jr. et al. | 455/450 |

* cited by examiner

Primary Examiner—Wellington Chin
Assistant Examiner—Sheila Smith

(74) Attorney, Agent, or Firm—John D. Crane; Matthew W. Baca; Andrew J. Dillon

(57) ABSTRACT

A method and system, for use with wireless communications systems having a cellular architecture, for achieving near real time reservation of channels in a first cell for servicing call-in-progress handoffs from other cells such that blocked calls originating within a first cell and blocked handoff of calls-in-progress from other cells are held within acceptable levels. The method and system specify that a minimum number of unutilized channels in a first cell be reserved for servicing call-in-progress handoffs. In the event that a request for a call-in-progress handoff from one of the other cells into the first cell cannot be serviced due to a lack of unutilized channels, the specified minimum number of reserved channels is dynamically adjusted upward and the request for a call-in-progress handoff that could not be serviced is enqueued. Enqueued requests are serviced in a first in first out fashion as unutilized channels become available. In the event that a request for a call-in-progress handoff from one of the other cells into the first cell can be serviced without being enqueued, the specified minimum number of reserved channels is dynamically adjusted downward such that a number of unutilized channels sufficient to service requests for handoff of calls-in-progress is dynamically maintained in a fashion that does not unduly restrict requests for call access from mobile subscriber units within the first cell.

22 Claims, 9 Drawing Sheets

Cell Cluster of Size 7
Wherein No
Frequencies Are Reused

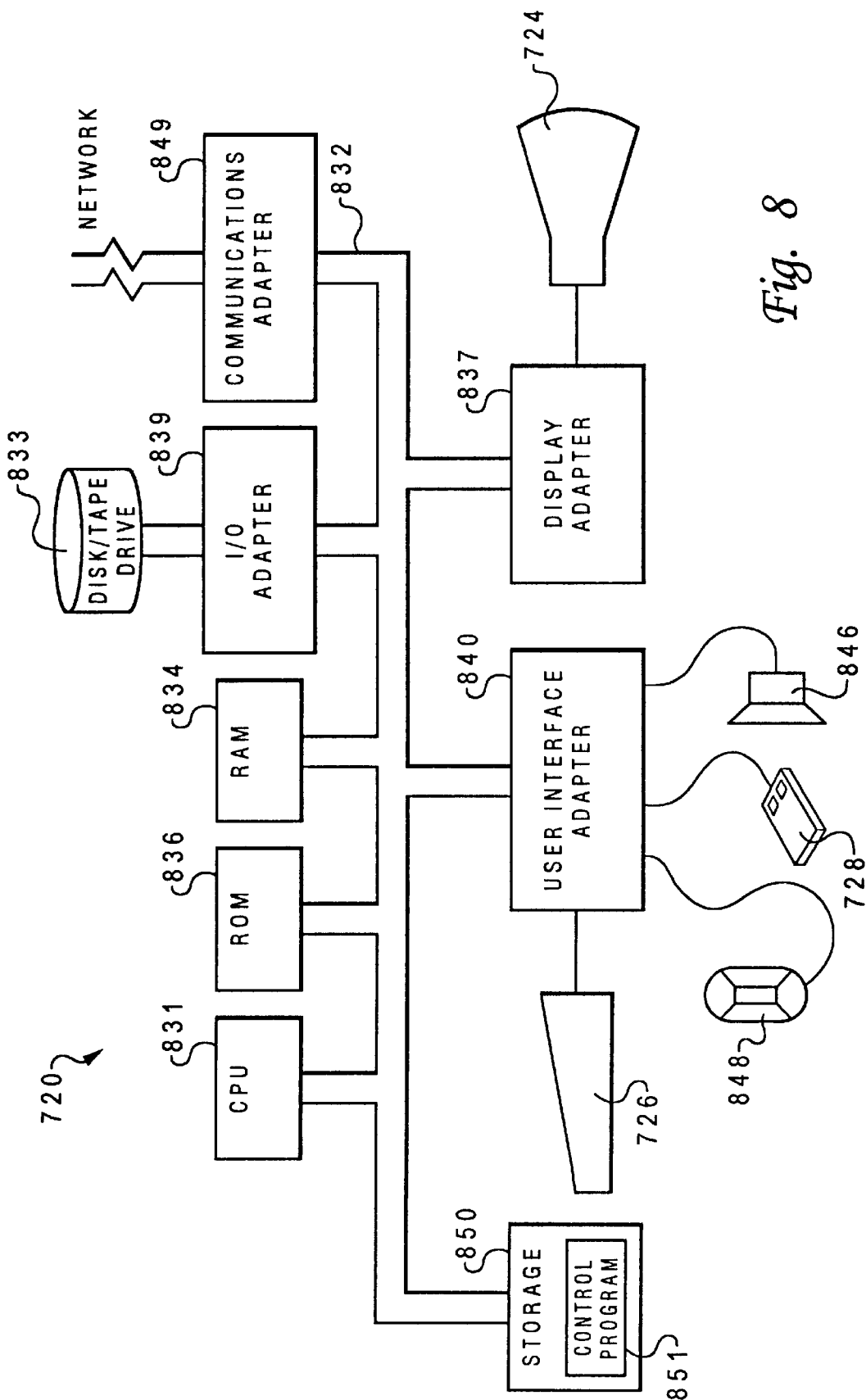

METHOD OF INTEGRATING HANDOFF QUEUING WITH ADAPTIVE HANDOFF RESERVE CHANNELS

BACKGROUND OF THE INVENTION

1. Technical Field

The present invention relates, in general, to an improved method and system to be utilized with wireless communication systems having cellular architectures. In particular, the present invention relates to an improved method and system, to be utilized with wireless communication systems having cellular architectures, and which dynamically reserve a number of unused channels for the exclusive use of handoffs of calls-in-progress and in sufficient number to service such requests such that blocked calls originating within an individual cell and blocked handoffs of calls-in-progress from other cells are held within acceptable levels. Yet still more particularly, the present invention relates to an improved method and system, to be utilized with wireless communication systems having cellular architectures, and which dynamically reserve a number of unused channels for the exclusive use of handoffs of calls-in-progress and in sufficient number to service such requests such that blocked calls originating within an individual cell and blocked handoffs of calls-in-progress from other cells are held within acceptable levels by creating a dynamic reserve channel pool which is adjusted on the basis of call requests originating inside a cell and handoff requests originating from outside the cell.

2. Description of the Related Art

The present invention is related to wireless communication systems, and, in particular, to wireless communication systems having a cellular architecture (e.g., cellular telephony, Personal Communication Systems, or Global System for Mobil Communication). Wireless communication refers to the fact that transmission between sending and receiving stations occurs via electromagnetic radiation not guided by any hard physical path (e.g., by microwave link.) Cellular architecture refers to the fact that the wireless system effects service over an area by utilizing a system that can be pictographically represented as a cellular grid.

Wireless cellular communication is the latest incarnation of a technology that was originally known as mobile telephone systems. Early mobile telephone system architecture was structured similar to television broadcasting. That is, one very powerful transmitter located at the highest spot in an area would broadcast in a very large radius. If a user were in the useable radius, then that user could broadcast to the base station and communicate by radiotelephone to the base station. However, such systems proved to be very expensive for the users and not very profitable to the communication companies supplying such services. The primary limiting factor of the original mobile telephone systems was that the number of channels available for use was limited due to severe channel-to-channel interference within the area served by the powerful transmitter. Thus, a problem arose as to how to provide more channels within the service area.

Counterintuitively, engineers discovered that channel-to-channel interference effects within the service area were not due solely to the distance between stations communicating with the base transmitter (which intuitively would seem to give rise to the interference,) but were also inversely related to the transmitter power (radius) of the area being served by the transmitter. Engineers found that by reducing the radius of an area by fifty percent, service providers could increase the number of potential customers in an area fourfold. It was found that systems based on areas with a one-kilometer radius would have one hundred times more channels than systems with areas with a ten-kilometers in radius. Speculation led to the conclusion that by reducing the radius of areas to a few hundred meters, the number of calls that could be served by each cell could be greatly increased.

Thus, reducing the power of the central transmitter allowed a significant increase in the number of available channels by reducing channel-to-channel interference within an area. However, as the power of the central transmitter was reduced, the serviceable area was also reduced. Thus, although reducing transmission power increased the number of available channels, the small service area provided by such reduced power did not make such radio telephone systems attractive communication options for many users. Thus, a problem arose relating to how to utilize the discovery that smaller cell sizes increased available channels in a fashion that would provide service attractive to users.

This problem was solved by the invention of the wireless cellular architecture concept. The wireless cellular architecture concept utilizes geographical subunits called "cells" and is buttressed by what is known as a frequency reuse concept. A cell is the basic geographic unit of a cellular system. Cells are base stations (a base station consists of hardware located at the defining location of a cell and includes power sources, interface equipment, radio frequency transmitters and receivers, and antenna systems) transmitting over small geographic areas that are represented as hexagons. Each cell size varies depending on the landscape. The term "cellular" comes from the honeycomb shape of the areas into which a coverage region is divided. Because of constraints imposed by natural terrain and man-made structures, the true shape of cells is not a perfect hexagon, but such shape serves as an effective tool for design engineering.

Within each cell a base station controller talks to many mobile subscriber units at once, using one defined transmit/receive communications channel per mobile subscriber unit. A mobile subscriber unit (a control unit and a transceiver that transmits and receives wireless transmissions to and from a cell site) uses a separate, temporary wireless channel to talk to a cell site. Transmit/receive communication channels use a pair of frequencies for communication—one for transmitting from the cell site base station controller, named the forward link, and one frequency for the cell site to receive calls from the users, named the reverse link. Both the forward and reverse link must have sufficient bandwidth to allow transmission of user data.

The frequency reuse concept is what made wireless cellular communications a viable reality. Wireless communication is regulated by government bodies (e.g., the Federal Communications Commission.) Government bodies dictate what frequencies in the wireless spectrum can be utilized for particular applications. Consequently, there are is a finite set of frequencies available for use with cellular communications. The frequency reuse concept is based on assigning to each cell a group of radio channels used within a small geographic area (cell.) Adjacent cells are assigned a group of channels that is completely different from any neighboring cell. Thus, in the frequency reuse concept there is always a buffer cell between two cells utilizing the same set of frequencies. The cells are sized such that it is not likely that two cells utilizing the same set of frequencies will interfere with each other. Thus, such a scheme allows "frequency reuse" by non-adjacent cells.

Since each contiguous cell utilizes different frequencies, the ability for such a system to supply continuous service across a cell grid requires that a call-in-progress be switched to a new transmit/receive channel as a user transits from one cell into another. That is, since adjacent areas do not use the same wireless channels, a call must either be dropped or transferred from one wireless channel to another when a user crosses the line between adjacent cells. Because dropping the call is unacceptable, the process of "handoff" was created. Handoff occurs when the mobile telephone network automatically transfers a call from wireless channel to wireless channel as a mobile subscriber unit crosses adjacent cells.

Handoff works as follows. During a call, a moving mobile subscriber unit is utilizing one voice channel. When the mobile unit moves out of the coverage area of a given cell site, the reception becomes weak. At this point, the base station controller in use requests a handoff. The system switches the call to another different frequency channel in a new cell without interrupting the call or alerting the user. The call continues as long as the user is talking, and generally the user barely notices the handoff.

The foregoing ideas of cells, frequency reuse, and handoff constituted the invention of the cellular concept. The invention of the cellular concept made the idea of wireless cellular communications a viable commercial reality.

The first large scale wireless communication system utilizing cellular architecture in North America was the Advanced Mobile Phone Service (AMPS) which was released in 1983. AMPS utilizes the 800-MHz to 900-MHz frequency band and the 30 KHz bandwidth for each transmit/receive channel as a fully automated mobile telephone service. Designed for use in cities, AMPS later expanded to rural areas. It maximized the cellular concept of frequency reuse by reducing radio power output. AMPS is utilized throughout the world and is particularly popular in the United States, South America, China, and Australia. AMPS uses frequency modulation (FM) for radio transmission. In the United States, transmission between the mobile and the base station uses separate frequencies on the forward and reverse links.

With the introduction of AMPS, user demand for bandwidth was initially slow until users became acquainted with the power of such a system. However, once users became acquainted with the power of cellular, the demand for the service exploded. Very quickly, even the extended number of channels available utilizing the cellular concepts of reduced power output and frequency reuse were quickly consumed. Users demanded yet more bandwidth, and a problem arose in the cellular industry.

Engineers responded to the problem by devising the Narrowband Analog Mobile Phone Service (NAMPS.) In this second generation of analog cellular systems, NAMPS was designed to solve the problem of low calling capacity. In the NAMPS three transmit/receive channels are frequency division multiplexed into the AMPS 30-kHz single transmit/receive channel bandwidth. Frequency division multiplexing is the process of deriving two or more simultaneous, continuous channels from a propagation medium that connects two points by (a) assigning separate portions of the available frequency spectrum to each of the individual channels, (b) dividing the frequency range into narrow bands, and (c) using each narrow band as a separate channel. Weik, *Communications Standard Dictionary* 375 (3ed. 1995). NAMPS services three users in one AMPS transmit/receive channel by dividing the 30-kHz AMPS bandwidth into three transmit/receive 10-kHz channels.

Thus, NAMPS essentially tripled the capacity of AMPS. However, although NAMPS tripled the capacity of AMPS, it also introduced significant adjacent channel interference effects. Users did not find such interference acceptable. The problem now was how to maintain the extended capacity of the NAMPS system, but without the interference effects.

This problem was more difficult, because at this point the engineers had pushed the limits of the analog channels of AMPS, via NAMPS, to their absolute data carrying capacity limits. Since the spectrum available to cellular was now being utilized as efficiently as possible, engineers had to find a new way to increase the bandwidth of AMPS, but without the adjacent channel interference introduced by NAMPS. They accomplished this by the overlaying of digital multiplexing technologies onto the analog channels available in AMPS. Such overlaying schemes are generally referred to as Digital AMPS, or DAMPS. North American digital cellular is alternatively referred to as both DAMPS and TDMA. One of the technologies so overlaid is that of Time Division Multiple Access (TDMA.)

Whereas frequency division multiplexing divides a transmit/receive channel into narrow frequency band transmit/receive channels so that more user data can be sent in the original transmit/receive channel, TDMA uses digital techniques to divide time access to an analog channel before users are even allowed to access the analog channel. TDMA uses digital signals and provides each call with time slots into which to insert digital data, so that several calls can occupy one bandwidth. Each caller is assigned a specific time slot. In some cellular systems, digital packets of information are sent during each time slot and reassembled by the receiving equipment into original signal components. TDMA uses the same frequency band and channel allocations as AMPS and NAMPS. Thus, such technology has extended the usable bandwidth of the AMPS to that of NAMPS, but has done so without the adjacent channel interference that is a by product of NAMPS.

Like NAMPS, TDMA provides three channels (i.e. supports three mobile subscriber units) in the same bandwidth as a single AMPS channel (that is, the analog transmission portion of TDMA is very similar to that of NAMPS). Unlike NAMPS, in TDMA digital signal processing is utilized to compress the spectrum necessary to transmit information by compressing idle time and redundancy of messages to be sent over a channel. Once such compressed data has been sent over a channel, sister digital processing equipment on the other end of the channel decompresses the signal. Such compression effectively allows more users to communicate over the bandwidth of AMPS.

AMPS, NAMPS and TDMA are currently being utilized in many parts of the world. AMPS and NAMPS both utilize handoff. Furthermore, since TDMA is digital multiplexing overlaid onto AMPS, TDMA also utilizes handoff.

Thus, AMPS, NAMPS, and TDMA all utilize cellular architecture and some variant of the above described handoff mechanism. For reasons that will now be described, certain facets of the currently utilized methods of effectuating the above described handoff of calls-in-progress from one cell into another cell are deficient.

It was explained above that in order for service to be provided across cells, the frequency reuse concept requires that handoff occurs when a mobile subscriber unit involved in a call-in-progress transits from one cell into another. Inherent within this requirement is that a channel be available within the cell into which the mobile subscriber unit is transiting, where such available channel is used to accept the call-in-progress into the cell.

It was also explained above that user demand for bandwidth in the past has been unrelenting. This demand, rather than subsiding, is growing at the present time. Consequently, if all users within some particular cells are allocated a channel on which to speak, it is quite possible that all the channels such as a cell, will be consumed. If all channels in a cell are consumed by users within that cell, no channels will be available for handoff when a mobile subscriber unit involved in a call-in-progress transits into the cell. Consequently, the call will be "dropped," or experience excessive interference, when it moves out of range of the base station controller of the cell from which it is transiting.

The problem of a cell having no channels available for handoff (and subsequently possibly "dropping" the call-in-progress) is often referred to in the art as "handoff blocking." One method of avoiding "handoff blocking" is to reserve "guard channels" within each individual cells. These reserved channels are then utilized to service handoff requests. Consequently, the ability of such cells to receive a handoff of a call-in-progress from another cell is ensured.

There are deficiencies in the way in which such channels are currently reserved. The deficiencies arise from the way in which guard channels are reserved. Some methods for reserving guard channels are based upon very sophisticated and complex statistical or fuzzy methods which track different variables such as peak and average cell call usage at specific times throughout a day, peak and average duration of call length, peak and average number of handoff requests at specific times throughout a day, etc. These tracked parameters are then numerically processed using high speed digital computers to determine how many guard channels should be reserved for handoff within a cell during different times. The objective of the numerical processing is to utilize the tracked parameters in order to simultaneously attempt to minimize the number of dropped calls due to inadequate reservation of guard channels and to minimize the number of blocked calls (which are blocked due to the fact that guard channels have been reserved) originating within the cell itself. That is, the numerical methods strive to find the optimum number of reserved guard channels at particular points in time.

Since the processing power necessary to implement the numerical processing is not always available, most systems resort to rigidly fixing the number of "guard channels" when such processing power is not available. However, such rigid fixing is not responsive to changing data traffic conditions and often results in either too many blocked handoffs or too many blocked calls.

The presently utilized methods for guard channel reservation generally consume much time and require very high speed computing equipment or result in excessive handoff blocking and/or call blocking. This is generally due to the fact that the present methods for reserving guard channels either track many different variables and subsequently computationally process the variables to determine guard channel reservation parameters, or rigidly fix the number of guard channels. Consequently, such methods either do not operate in real time and are computationally intensive or are non-responsive to changing data traffic. These facts prove disadvantageous and are likely to prove even more disadvantageous as time goes on.

It was mentioned above that as cell size is decreased, the number of channels (and thus users) that can be accommodated within the cell increases. Currently, the industry uses this fact to satisfy increases in user demand for bandwidth. That is, as user demand for bandwidth exceeds the capacity of a cell, the cell is subsequently subdivided into smaller cells having more channel carrying capacity. This operation is known as "cell splitting."

Cell splitting decreases the physical size of the cells. However, assuming mobile subscriber units continue to transit cells at the same velocity as before, it is clear that all equipment in the cells will have to increase in speed in that the decreased physical size increases the speed at which decisions have to be made. For example, a mobile subscriber unit with a call-in-progress traveling eighty miles per hour across 5 cells of approximately 1.0 mile in width will need a handoff approximately (assuming handoff takes place exactly at cell boundaries) every 45 seconds. However, if due to increased user demand for bandwidth each cell is subdivided (split) such that each cell is now 0.5 miles in width, the mobile subscriber unit will need a handoff every 22.5 seconds.

It is apparent that as cell size is reduced and channel density increased a point will be reached where existing guard band reservation methods will be insufficient in that the processing time required by the numerical processing methods will exceed that available to make a decision. Furthermore, rigidly fixing the number of guard channels will be insufficient in that handoff requests are likely to vary greatly dependent upon the number of calls in progress transiting cell boundaries and the velocity at which mobile subscriber units are transiting the cells.

In addition to the foregoing, the current numerical processing methods are deficient in that they tend to be predictive rather than reactive. That is, they tend to use some predefined baseline of historical channel usage and handoff requests to predict future numbers of handoff requests. The number of guard channels are then reserved using these predicted future numbers of handoff requests. Such reservation proves to be deficient if the future numbers of handoff requests vary significantly from the predicted numbers.

Thus, it is apparent that a need exists for a method and system which will perform reservation of guard channels in near real time and such that neither unacceptable amounts of handoff blocking nor call blocking occur within a cell.

SUMMARY OF THE INVENTION

It is therefore one object of the present invention to provide an improved method and system to be utilized with wireless communication systems having cellular architectures.

It is yet another object of the present invention to provide an improved method and system, to be utilized with wireless communication systems having cellular architectures, and which dynamically reserve a number of unused channels for the exclusive use of handoffs of calls-in-progress and in sufficient number to service such requests such that blocked calls originating within an individual cell and blocked handoffs of calls-in-progress from other cells are held within acceptable levels.

It is yet another object of the present invention to provide an improved method and system, to be utilized with wireless communication systems having cellular architectures, and which dynamically reserve a number of unused channels for the exclusive use of handoffs of calls-in-progress and in sufficient number to service such requests such that blocked calls originating within an individual cell and blocked handoffs of calls-in-progress from other cells are held within acceptable levels by creating a dynamic reserve channel pool which is adjusted on the basis of call requests originating inside a cell and handoff requests originating from outside the cell.

The foregoing objects are achieved as is now described. A method and system are provided for use with wireless communication systems having a cellular architecture with a plurality of cells. The method and system achieve near real time reservation of channels in a first cell for servicing call-in-progress handoffs from other cells in such a fashion that blocked calls originating within the first cell and blocked handoff of calls-in-progress from other cells are held within acceptable levels. The method and system achieve their objects via the following. Specifying that a minimum number of unutilized channels in a first cell be reserved for servicing call-in-progress handoffs. In the event that a request for a call-in-progress handoff from one of the other cells into the first cell cannot be serviced due to a lack of unutilized channels, dynamically adjusting the specified minimum number of reserved channels upward and enqueuing the request for a call-in-progress handoff that could not be serviced, with such enqueued requests being serviced in a first in first out fashion as unutilized channels become available. But in the event that a request for a call-in-progress handoff from one of the other cells into the first cell can be serviced without being enqueued, dynamically adjusting the specified minimum number of reserved channels downward. In response to a request for call access from a mobile subscriber unit within the first cell, determining if the number of unutilized channels in the first cell has fallen below the specified minimum number reserved for servicing call-in-progress handoffs. In response to a determination that the number of unutilized channels in the first cell has fallen below the specified number of unutilized channels reserved for servicing call-in-progress handoffs, enqueuing the request for call access, with such enqueued requests being serviced in a first in first out fashion as unutilized channels become available provided that the number of unutilized channels reserved for servicing call-in-progress handoffs meets or exceeds the specified minimum number. In response to a determination that the number of unutilized channels in the first cell has not fallen below the specified number reserved for servicing call in progress handoffs, servicing the request for call access such that a number of unutilized channels sufficient to service requests for handoff of calls-in-progress is dynamically maintained in a fashion that does not unduly restrict requests for call access from mobile subscriber units within the first cell.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 8 is an illustration of a representative hardware environment which can be utilized in accordance with the method and system of an illustrative embodiment of the present invention.

DETAILED DESCRIPTION OF ILLUSTRATIVE EMBODIMENT

Figure 1:
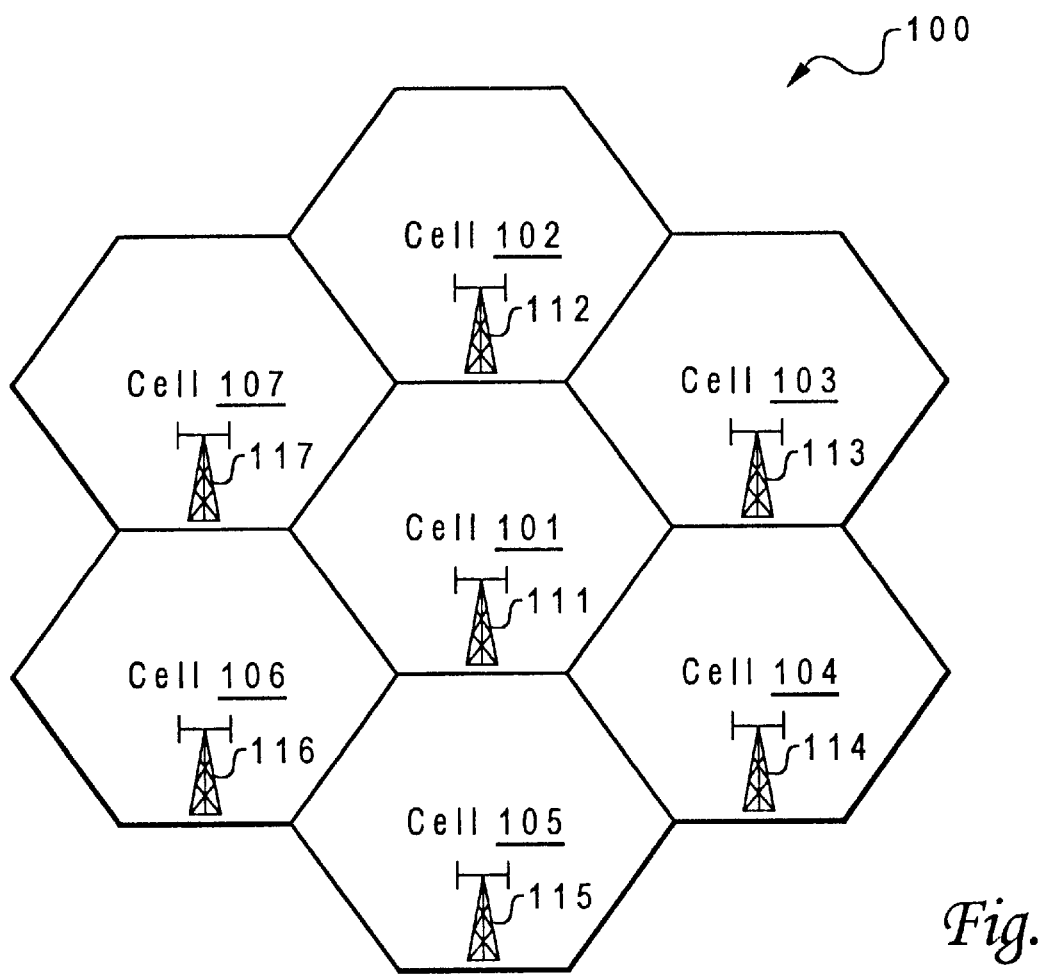
FIG. 1 depicts a cell cluster within a wireless communication system having a cellular architecture within which the method and system of the present invention may be implemented.

With reference to the figures and in particular with reference now to FIG. 1, there is depicted a cell cluster within a wireless communication system having a cellular architecture within which the method and system of the present invention may be implemented. Recall that in the above discussion it was noted that frequency reuse is a concept that has been utilized to allow cellular communications over a large area. It is common to create a cell cluster, as is shown in FIG. 1, whereby the frequency reuse concept is implemented. A cell cluster is a group of cells. No channels are reused within a cluster. FIG. 1 illustrates seven-cell cluster 100.

A "cell" is the basic geographic unit of a cellular system. The term "cellular" comes from the honeycomb shape of the areas into which a coverage region is divided. In FIG. 1 each cell 101, 102, 103, 104, 105, 106, and 107 is depicted as a honeycomb shape within which base stations 111, 112, 113, 114, 115, 116 and 117, respectively, are shown. Cells are pictographic representations of the effective geographic area of base station (a base station includes but is not limited to transmitters and receivers sufficient to service existing cell channels within a particular cell) transmitters that are for convenience represented as hexagons. Each cell size varies depending on the landscape. Because of constraints imposed by natural terrain and man-made structures, the true shape of cells is not a perfect hexagon.

Since seven-cell cluster 100 utilizes the frequency reuse concept, each cell in FIG. 1 utilizes a set of channels wherein each channel is based upon a set of carrier frequencies different from those utilized by any other cell 101, 102, 103, 104, 105, 106, 107 within seven-cell cluster 100. Thus, if available frequencies are divided evenly, each cell 101, 102, 103, 104, 105, 106, and 107 will utilize $1/7$ of frequencies available for use.

Figure 2:
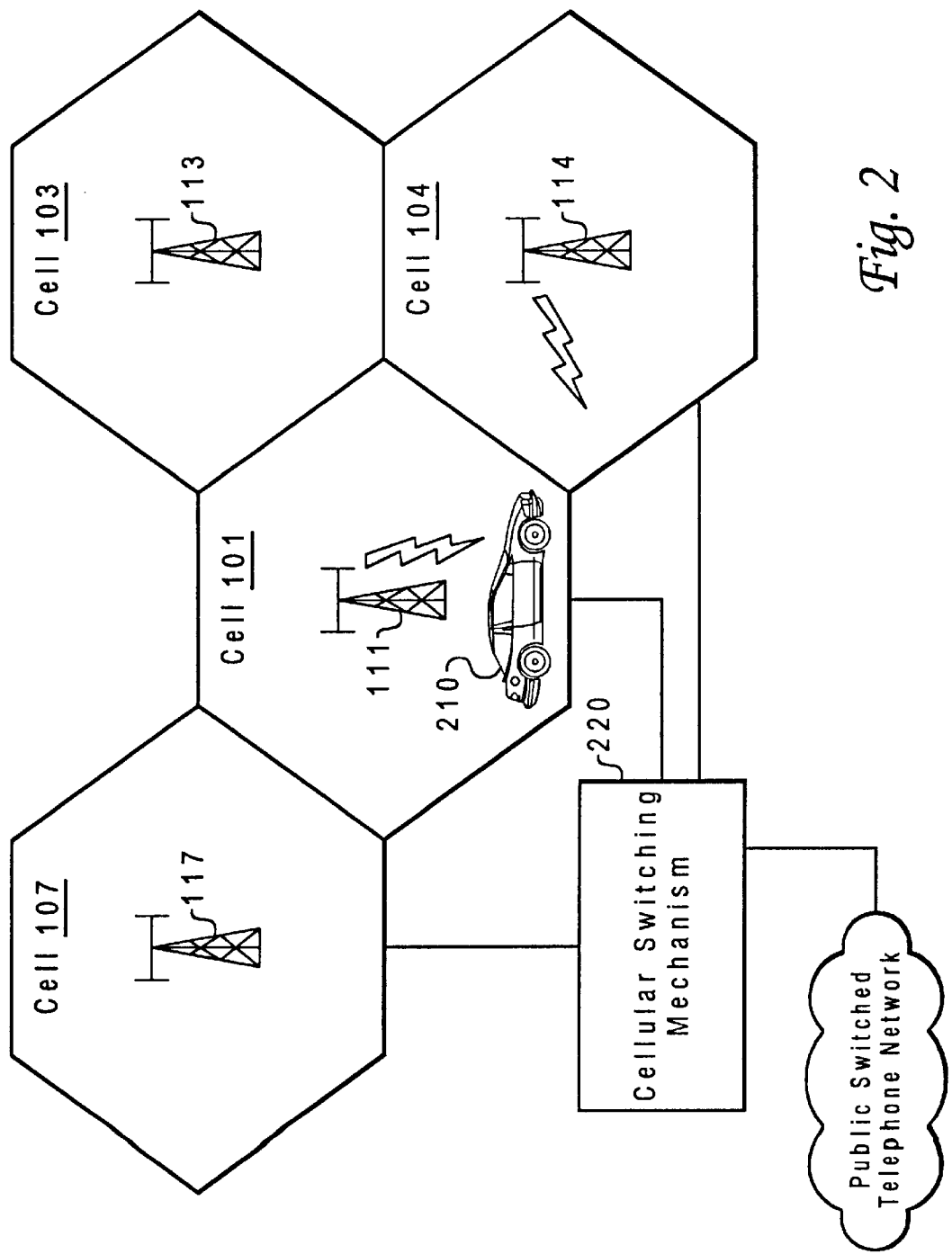
FIG. 2 is a partially schematic diagram depicting a mobile subscriber unit 210 transiting from cell 101 to cell 104.

Refer now to FIG. 2, which is a partially schematic diagram depicting a mobile subscriber unit 210 transiting from cell 101 to cell 104. Recalling from the discussion above that each "cell" is actually a pictographic representation of the effective area of use covered by a base station, it can be seen from FIG. 2 that when mobile subscriber unit 210 transits from cell 101 to cell 104, the base station 114 of cell 104 must either assume responsibility for any call-in-progress between mobile subscriber unit 210 or any such call-in progress will be terminated (i.e., "dropped"). As has been discussed, cell 104 assumes responsibility for any call-in-progress between mobile subscriber unit 210 and base station 111 serving cell 101 by the "handing off" the call to base station 114 serving cell 104. This process of "handing off" is merely called "handoff" in the art.

Regardless of technology, the following steps are part of handoff of any call. The first step in handoff is to assume a starting state wherein only one cell is supporting a call in question, which in FIG. 2 relates to cell 101 supporting a call from mobile subscriber unit 210. The second step in handoff is to determine that over-the-air link conditions between mobile subscriber unit 210 and serving cell 101 are deteriorating, and that there is a potentially better link to a new, candidate cell adjoining cell 101. The third step is to select a candidate cell for handoff, which in FIG. 2 equates to cell 104 since that is the cell into which mobile subscriber unit 210 is transiting. The fourth step is to inform chosen candidate cell 104 of the imminent handoff, and of the parameters necessary to identify mobile subscriber unit 210 and execute the handoff. The fifth step is for cell 104 to answer back to cell 101 indicating mobile subscriber unit 210 what channel mobile subscriber unit 210 is to be assigned for communication within cell 104. The sixth step is for cell 104 to direct the mobile to begin executing the handoff, which equates to instructing the mobile to tune to an assigned channel for communication within cell 104. The seventh step is for cell 104 to assume responsibility for the call on the channel that cell 104 has assigned to mobile subscriber unit 210. Lastly, following successful handoff cell 101 drops responsibility for the call.

As has been discussed, TDMA typically consists of an overlay of digital signal processing onto an AMPS or a NAMPS system, and NAMPS generally consists of the Frequency Division Multiplexing of an AMPS system. Thus, TDMA continues to use hand off, and insofar as handoff decisions are concerned, the handoff is generally made on the basis of the strength of the received AMPS signals. Consequently, the following discussion will describe handoff of an AMPS system, with it being understood that such discussion also applies to NAMPS, TDMA systems, or any digital system transmission over a wireless link which utilizes handoff.

The handoff trigger in an AMPS system can be any one of several things. Absolute received signal level as measured by the current serving cell receiver, signal power difference between the current serving cell and a candidate cell, or receiver quieting as measured, for example, by the post-detection signal-to-noise ratio. However, the solution that has generally been adopted by the infrastructure manufacturers is to monitor a received signal strength indicator (RSSI) on the current serving cell. When the RSSI drops below a threshold, then measurements are requested by cellular switching mechanism 220 from predetermined handoff candidate cells (e.g., all or a part of the cells surrounding a current cell.) After the measurement reports are collected by cellular switching mechanism 220 the candidate cell is chosen and handoff is initiated.

Figure 3:
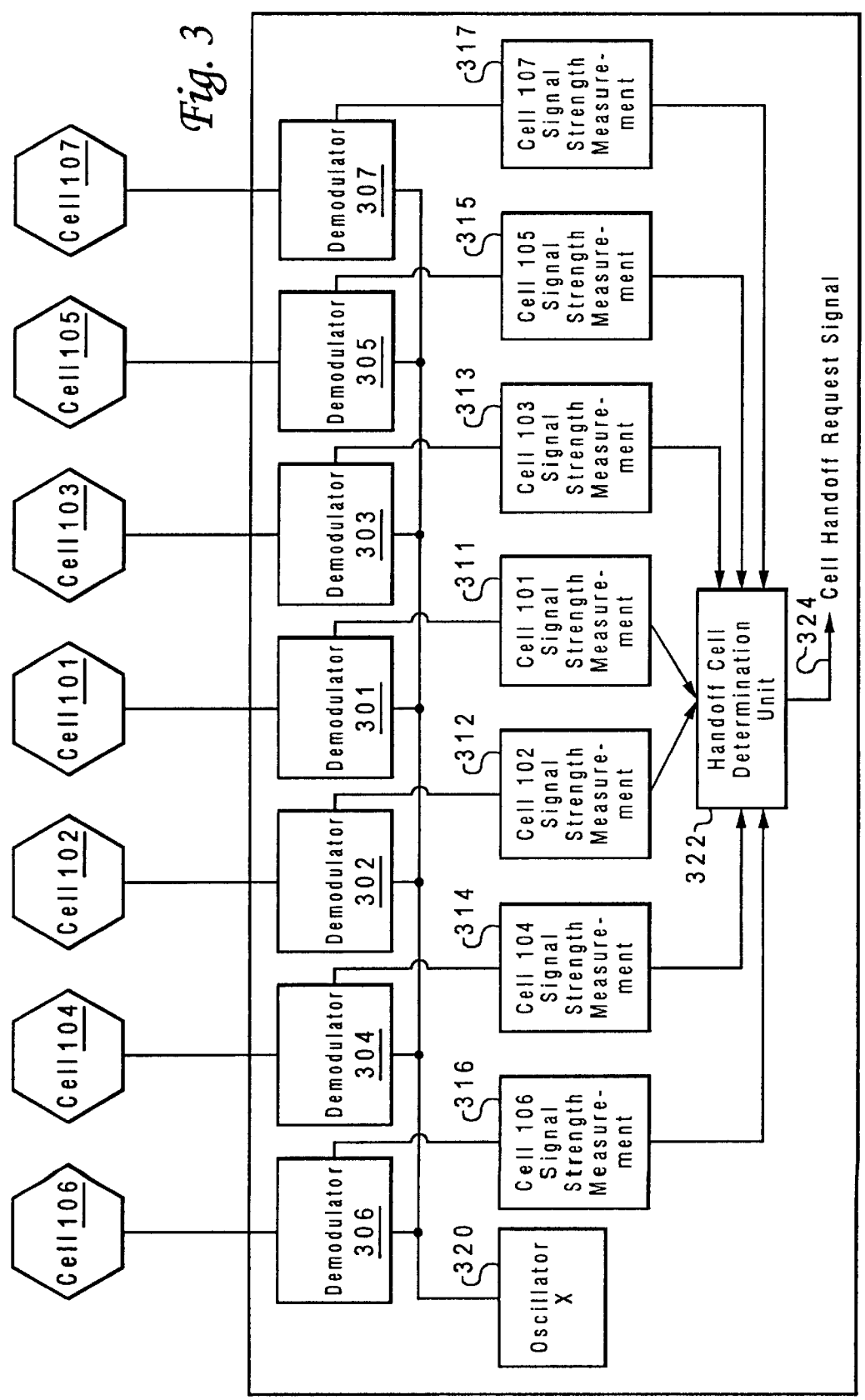
FIG. 3 is a partially schematic representation demonstrating concepts involved in handoff based on a Received Signal Strength Indicator.

Refer to FIG. 3, which is a partially schematic representation demonstrating some of the concepts involved in handoff based on RSSI. Assume, that as shown in FIG. 2, mobile subscriber unit 210 is being serviced by cell 101, but that mobile subscriber unit 210 is currently transiting into cell 104. Assume also that while in cell 101 mobile subscriber unit 210 is utilizing a channel "X" of cell 101. Recall from above that the first step in handoff is determining that a RSSI has fallen below some threshold. FIG. 3 illustrates a mechanism whereby this quantity could be measured in that a signal from cell 101 is fed into demodulator 301 which is being driven by an oscillator 320 at the receive frequency of channel "X" of cell 101. The demodulated receive signal of channel "X" is then fed into cell 101 received signal strength measurement device 311, which produces a Received Signal Strength Indicator (RSSI) which is fed to (among other things) handoff cell determination unit 322. Once handoff cell determination unit 322 has determined that the RSSI of Channel "X" in Cell 1 has fallen below a certain predetermined threshold, handoff cell determination unit 322 queries (queries not shown) other cells (which for sake of illustration are shown in FIG. 3 as the rest of the cells in seven-cell cluster 100) as to the strength of mobile subscriber unit 210 transmissions on Channel "X" of cell 101 in those queried cells.

FIG. 3 shows that in response to the queries, (again, queries are not shown) the signals received in each of the queried cells 102–107 are demodulated by demodulators 302–307 using the frequency generated by oscillator 320 (oscillator 320 generates the frequency upon which mobile subscriber unit 210 transmits while using channel "X" in cell 101.) FIG. 3 depicts that such demodulated signals are then fed into received signal strength measurement devices 312, 313, 314, 315, 316, and 317 which measure the strength of the received signal in cells 102, 103, 104, 105, 106, and 107, respectively. The respective RSSIs for each cell produced by each of the signal strength measurement devices 302–307 are then fed to handoff cell determination unit 322. Handoff cell determination unit 322 then utilizes the RSSIs of the strength of the signal in cells 102–107 in order to determine which cell the call-in-progress from mobile subscriber unit 310 is to be handed into.

Continuing with the situation shown in FIG. 2, the situation of FIG. 2 indicates that as mobile subscriber unit 210 transits into cell 104, the RSSI for the transmit signal of mobile subscriber unit 210 will be highest in cell 104. Thus, when the transmit signal from mobile subscriber unit 210 falls below a predetermined threshold RSSI in cell 101, handoff cell determination unit 322 determines that cell 104 is the appropriate candidate cell for handoff and thus initiates cell handoff request signal 324.

Figure 4:
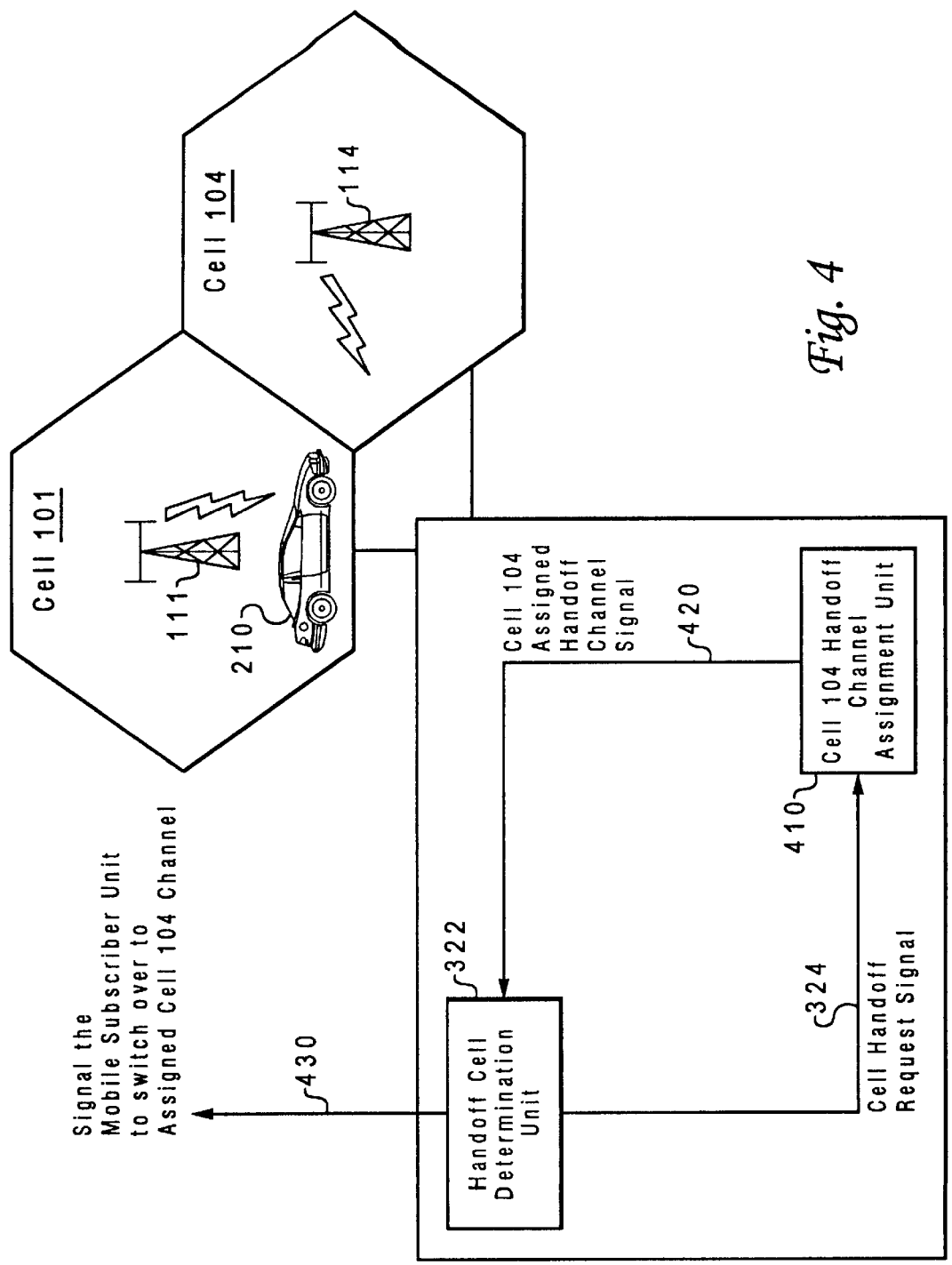
FIG. 4 illustrates events subsequent to handoff cell determination unit 322 initiating cell handoff request signal 324 as was discussed in relation to FIG. 3.

FIG. 4 illustrates events subsequent to handoff cell determination unit 322 initiating cell handoff request signal 324 as was discussed in relation to FIG. 3. Cell handoff request signal 324 informs cell 104 handoff channel assignment unit 410 that cell 104 is to assume responsibility for mobile subscriber unit 210 (it will be assumed for ease of illustration of an illustrative embodiment of the present invention that the cell 104 can accept handoff,) which is currently utilizing channel "X" within cell 104. Cell 104 handoff channel assignment unit 410 will determine which of cell 104's available unused channels will be assigned to mobile subscriber unit 210 for communication within cell 104. Once cell 104 handoff channel assignment unit 410 has determined an unutilized channel in cell 104 to which mobile subscriber unit 210 is to be assigned, it sends a signal (cell 104 assigned handoff channel signal 420) back to handoff cell determination unit 322, which subsequently initiates communication with mobile subscriber unit 210 and directs mobile subscriber unit 210 to begin communicating with base station 114 in cell 104 on the frequencies (forward and return links) encompassed by the assigned channel of cell 104 via switch over to assigned cell 104 channel signal 430.

Figure 5:
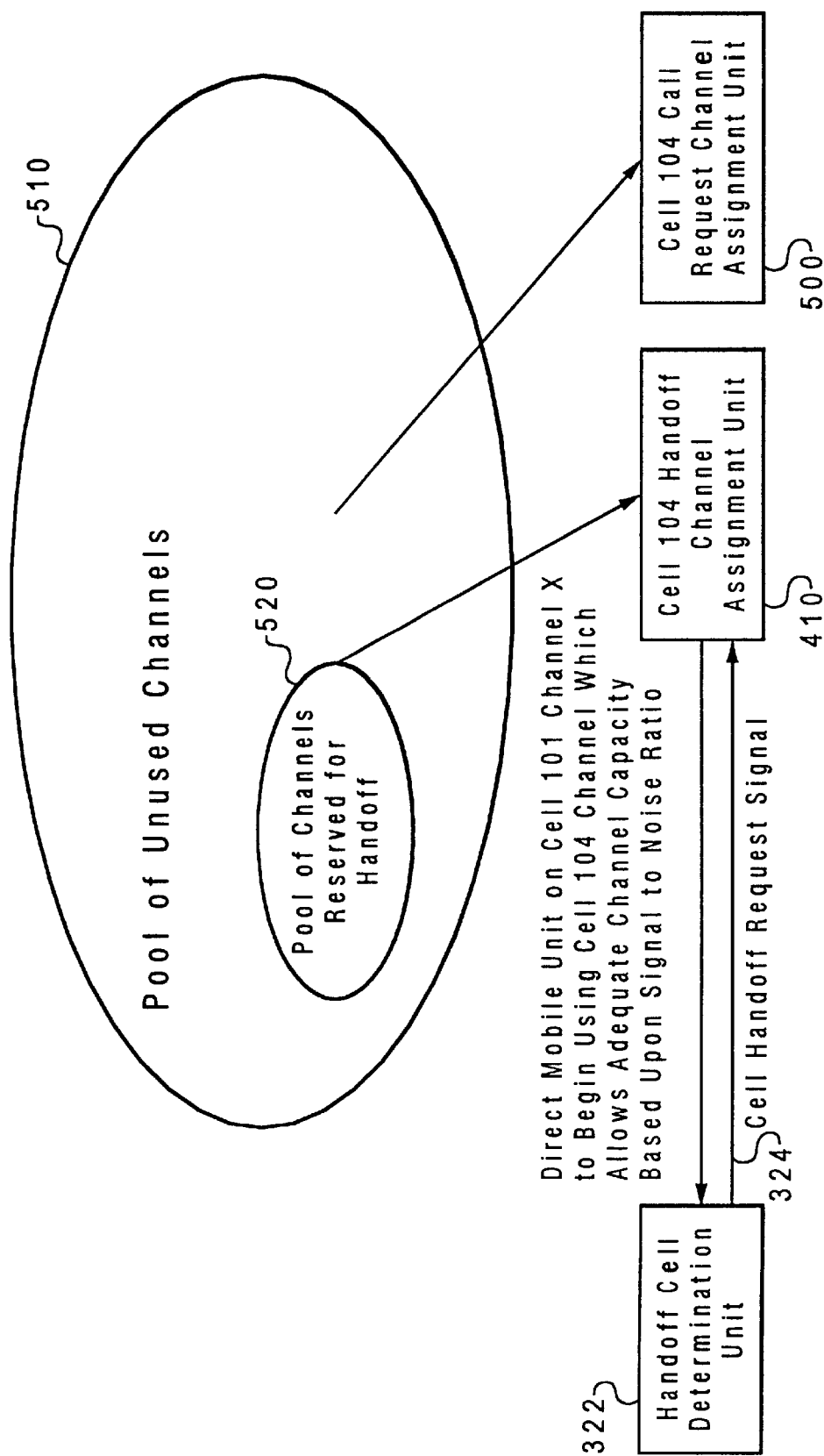
FIG. 5 depicts a partially schematic diagram of concepts involved when cell 104 handoff channel assignment unit 410 assigns an unused channel to mobile subscriber unit 210 in response to cell handoff request signal 324.

FIG. 5 depicts a partially schematic diagram of concepts involved when cell 104 handoff channel assignment unit 410 assigns an unused channel to mobile subscriber unit 210 in response to cell handoff request signal 324. It was assumed in FIG. 4 that a channel within cell 104 would be available to accept the handoff of mobile subscriber unit 210's call in progress. Shown in FIG. 5 is that cell 104 handoff channel assignment unit 410 selects the channel to be assigned from pool of unused channels 510. Also shown in FIG. 5 is cell 104 call request channel assignment unit 500. Cell 104 call request channel assignment unit 500 assigns channels in response to requires for channel access (not shown) that originate within cell 104. Shown in FIG. 5 is that cell 104 call request channel assignment unit 500 also selects channels to be assigned from pool of unused channels 510.

Shown, for illustrative purposes, is that pool of unused channels 510 has been further subdivided into pool of channels reserved for handoff 520, and all other unused channels. Such reservation of channels to service handoff requests ensures that handoffs of calls-in-progress are not dropped as a mobile subscriber unit transfers into a cell (e.g., as mobile subscriber unit 210 transits from cell 101 into cell 104.)

Pool of channels reserved for handoff 520 cannot be utilized by cell 104 call request channel assignment unit 500. That is, any channel within pool of channels reserved for handoff 520 is unavailable for any other use, whether or not such channels are actually being utilized.

As has been explained above, if the pool of channels reserved for handoff 520 is too small, then handoffs into cell 104 can be dropped. Conversely, if the pool of channels reserved for handoff 520 is too large, then calls originating within cell 104 can be blocked. What is needed is a method and system which will provide sufficient numbers of channels reserved for handoff and without excessively blocking calls, and vice versa. FIG. 6 illustrates how at least one illustrative embodiment of the present invention provides such a capability.

Figure 6A:
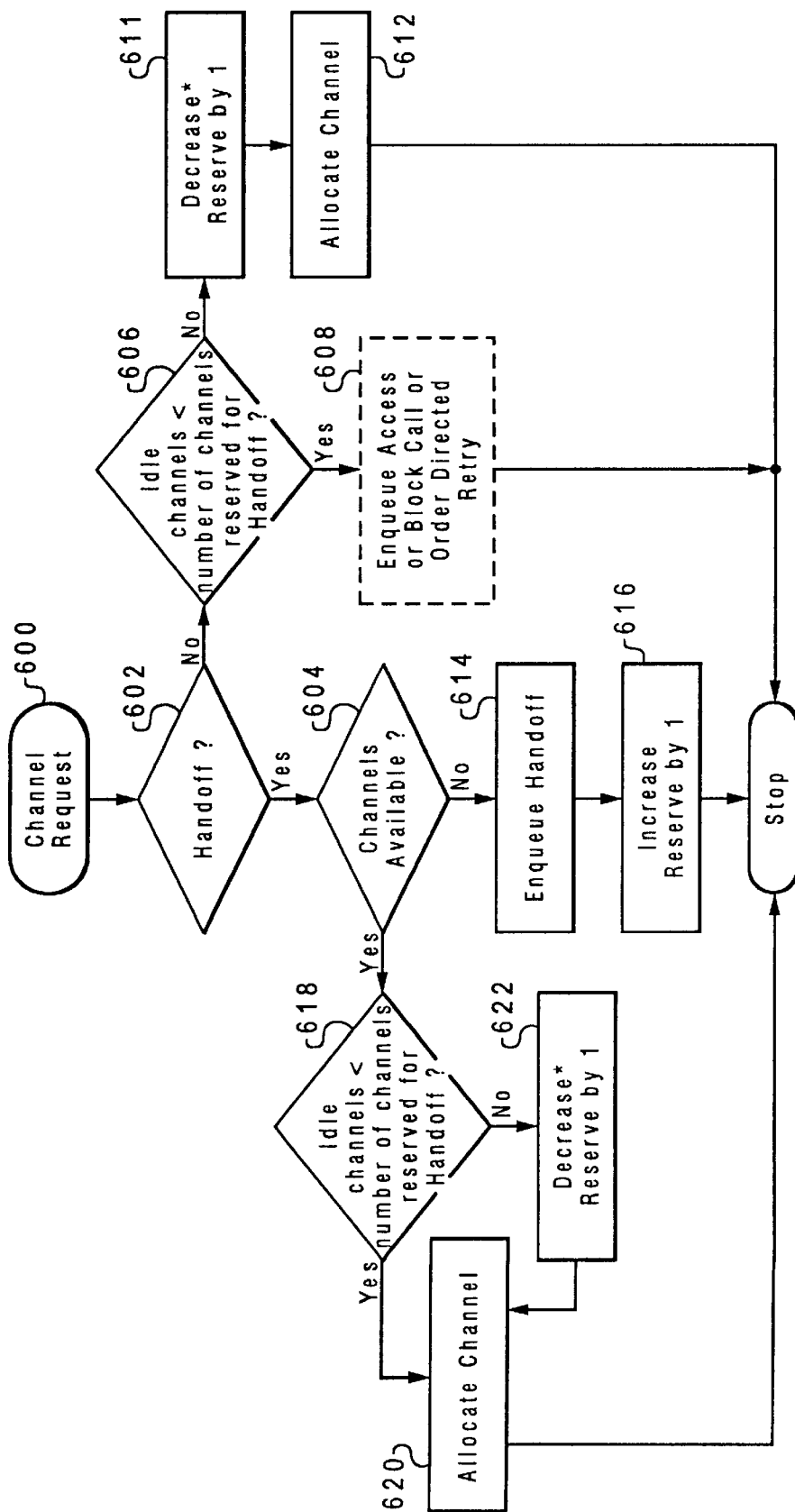
FIG. 6A is a high-level logic flowchart depicting the method and process of one illustrative embodiment of the present invention.

Refer now to FIG. 6A, which is a high-level logic flowchart depicting the method and process of one illustrative embodiment of the present invention. Method step 600 depicts the initial event in the process, which is the receipt of a request for channel access by a channel assignment unit within a particular cell. Method step 602 depicts the determination of whether the channel request received in method step 600 was a handoff request. If it is determined that the request for channel access received in method step 600 was a handoff request, then the process proceeds to method step 604. However, if it is determined that the request for channel access received in method step 600 was not a handoff request, then it is known that what was received was merely a request for channel access for a call to originate within the cell. Accordingly, the process proceeds to method step 606, which depicts the operation wherein it is determined if the unutilized (idle) channels within the cell are less than a preset number of channels (hereinafter referred to as "number of channels to be reserved for handoff") within the cell which have been reserved for handoff; that is, whether the handoff reserve has been met. If the number of idle channels has fallen below the preset number of channels reserved for handoff, the request for channel access will not be granted, and thus the process proceeds to method step 608 which depicts the (optional) operations of either the request for channel access being enqueued, or the request for channel access being blocked, or directing the requesting unit to retry call access in some other cell; subsequently, the process proceeds to method step 610 and stops. If it is determined in method step 606 that the number of idle channels within the cell is at or above the preset number reserved for idle channels, then it is known that channels are available to answer the received request for channel access, and thus the process proceeds to method step 611 which depicts that the "number of channels to be reserved for handoff" is decreased by one (provided such number is non-zero). Thereafter, the process proceeds to method step 612 wherein an unutilized channel is allocated to the satisfy the request for channel access. Subsequently, the process proceeds to method step 610 and stops.

As stated above, if it is determined that the request for channel access received in method step 600 was a handoff request, then the process proceeds to method step 604. Method step 604 depicts the inquiry of whether or not one or more idle (unutilized) channels are available. If the inquiry depicted in method stop 604 indicates that one or more idle (unutilized) channels are not available, then the process proceed to method step 614 which depicts the operation of the request for handoff being enqueued. Subsequently, the process proceeds to method step 616 which depicts the operation whereby the "number of channels to be reserved for handoff" is increased by one. Thereafter, the process proceeds to method step 610 and stops.

If the inquiry depicted in method stop 604 indicates that one or more idle (unutilized) channels are available, then the process proceed to method step 618 which illustrates the operation wherein it is determined if the unutilized (idle) channels within the cell are less than a preset number of channels (hereinafter referred to as "number of channels to be reserved for handoff") within the cell which have been reserved for handoff; that is, whether the handoff reserve has been met. If it is determined that the number of idle channels has fallen to or below the number of channels reserved for handoff, the process proceeds to method step 620 which depicts the operation of the handoff request being granted by the allocation of an unutilized channel to service the handoff request; subsequently, the process proceeds to method step 610 and stops.

If it is determined in method step 618 that the number of idle channels within the cell is above the preset number reserved for idle channels, the process proceeds to method step 622 which depicts that the "number of channels to be reserved for handoff" is decreased by one (provided such number is non-zero). Subsequently, the process proceeds to method step 620 which depicts the operation of the handoff request being granted by the allocation of an unutilized channel to service the handoff request; subsequently, the process proceeds to method step 610 and stops.

When it is known that channels are available to answer the received request for channel access, and thus the process proceeds to method step 612 wherein an utilized channel is allocated to the satisfy the request for channel access. Subsequently, the process proceeds to method step 610 and stops.

Figure 6B:
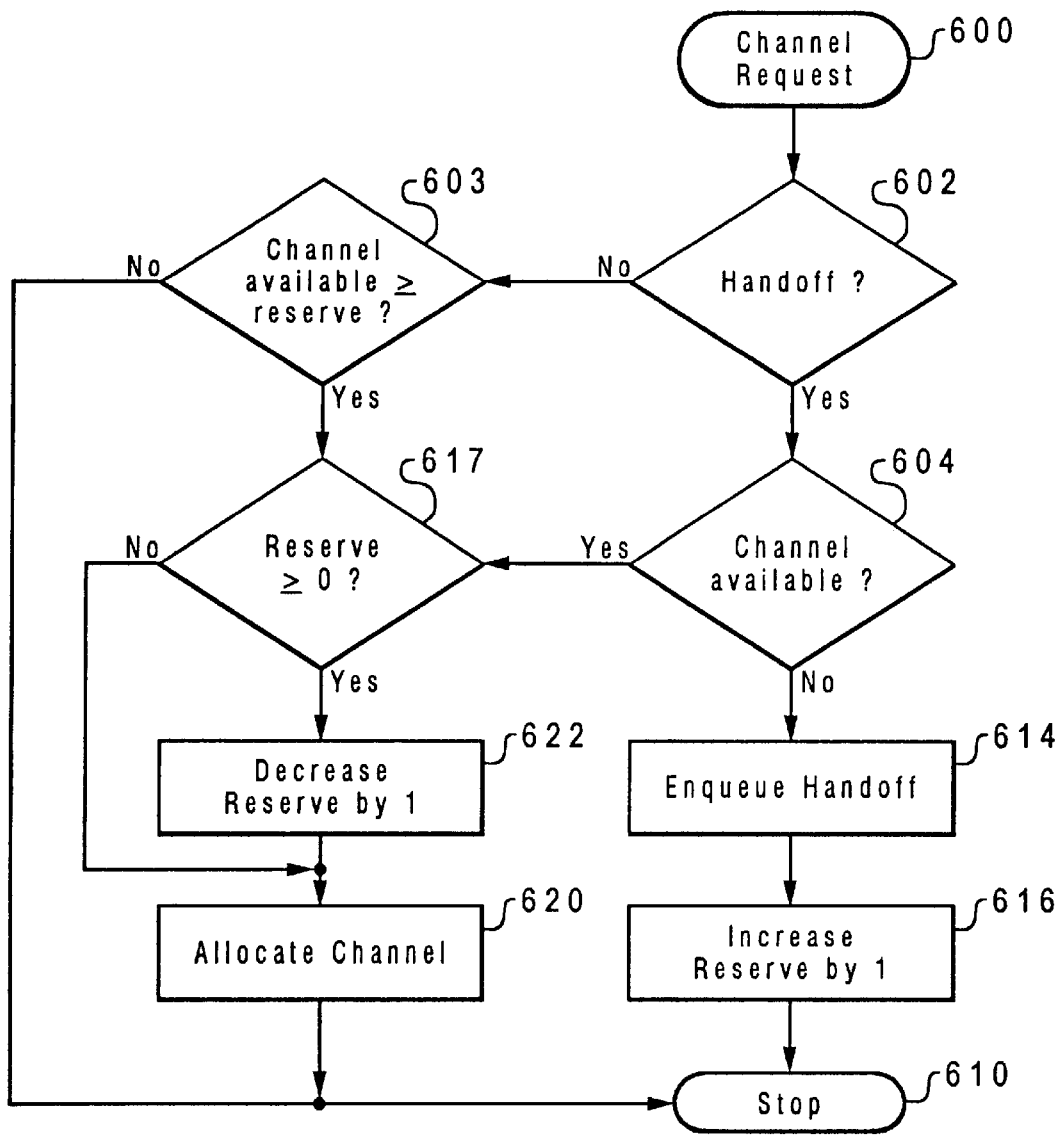
FIG. 6B is a high-level logic flowchart depicting the method and process of another illustrative embodiment of the present invention.

Refer now to FIG. 6B, which is a high-level logic flowchart depicting the method and process of another illustrative embodiment of the present invention. Like numbered components of FIG. 6B have the same functions as noted previously in relation to FIG. 6B unless otherwise noted. Method step 600 depicts the initial event in the process, which is the receipt of a request for channel access by a channel assignment unit within a particular cell. Method step 602 depicts the determination of whether the channel request received in method step 600 was a handoff request. If it is determined that the request for channel access received in method step 600 was a handoff request, then the process proceeds to method step 604. However, if it is determined that the request for channel access received in method step 600 was not a handoff request, then it is known that what was received was merely a request for channel access for a call to originate within the cell. Accordingly, the process proceeds to method step 603, which depicts the operation wherein it is determined if the number of unutilized (idle) channels within the cell is greater than or equal to a preset number of channels (hereinafter referred to as "number of channels to be reserved for handoff") within the cell which have been reserved for handoff. If the number of idle channels has fallen below the preset number of channels reserved for handoff, the request for channel access will not be granted, and the process proceeds to method step 610 and stops. If it is determined in method step 603 that the number of idle channels within the cell is at or above the preset number reserved for idle channels, then it is known that channels are available to answer the received request for channel access, and thus the process proceeds to method step 617 which illustrates the determination of whether the "number of channels reserved for handoff" is greater than zero. In the event that the "number of channels reserved for handoff" is greater than zero, then the process proceeds to method step 622 which depicts that the "number of channels to be reserved for handoff" is decreased by one (provided such number is non-zero). Thereafter, the process proceeds to method step 620 wherein an unutilized channel is allocated to the satisfy the request for channel access. Subsequently, the process proceeds to method step 610 and stops.

In the event that the "number of channels reserved for handoff" is equal to zero, then the process proceeds to method step 620 wherein an unutilized channel is allocated to the satisfy the request for channel access. Subsequently, the process proceeds to method step 610 and stops.

As stated above, if it is determined that the request for channel access received in method step 600 was a handoff request, then the process proceeds to method step 604. Method step 604 depicts the inquiry of whether or not one or more idle (unutilized) channels are available. If the inquiry depicted in method stop 604 indicates that one or more idle (unutilized) channels are not available, then the process proceed to method step 614 which depicts the operation of the request for handoff being enqueued. Subsequently, the process proceeds to method step 616 which depicts the operation whereby the "number of channels to be reserved for handoff" is increased by one. Thereafter, the process proceeds to method step 610 and stops.

If the inquiry depicted in method stop 604 indicates that one or more idle (unutilized) channels are available, then the process proceeds to method step 617 which illustrates the determination of whether the "number of channels reserved for handoff" is greater than zero. In the event that the "number of channels reserved for handoff" is greater than zero, then the process proceeds to method step 622 which depicts that the "number of channels to be reserved for handoff" is decreased by one (provided such number is non-zero). Thereafter, the process proceeds to method step 620 wherein an unutilized channel is allocated to the satisfy the request for channel access. Subsequently, the process proceeds to method step 610 and stops.

Figure 7:
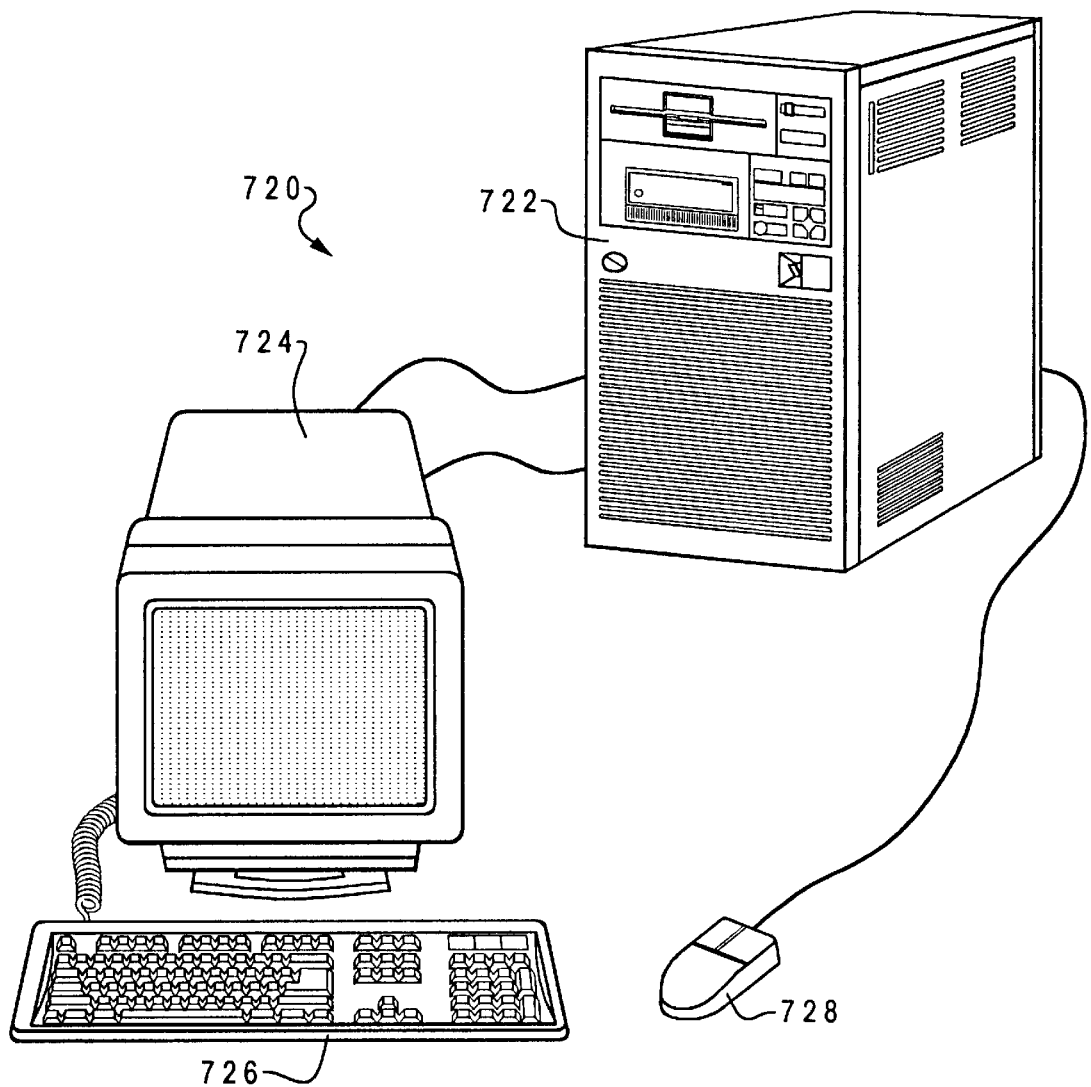
FIG. 7 depicts a pictorial representation of a data-processing system which can be utilized in accordance with the method and system of an illustrative embodiment of the present invention.

With reference now to the figures and in particular with reference now to FIG. 7, there is depicted a pictorial representation of a data-processing system which can be utilized in accordance with the method and system of an illustrative embodiment of the present invention. The method and system provided by an illustrative embodiment of the present invention can be implemented with the data-processing system depicted in FIG. 7. A computer 720 is depicted which includes a system unit 722, a video display terminal 724, a keyboard 726, and a mouse 728. Computer 720 may be implemented utilizing any suitably powerful computer, such as commercially available mainframe computers, minicomputers, or microcomputers.

FIG. 8 is an illustration of a representative hardware environment which can be utilized in accordance with the method and system of an illustrative embodiment of the present invention. FIG. 8 depicts selected components in computer 720 in which an illustrative embodiment of the present invention may be implemented. System unit 722 includes a Central Processing Unit ("CPU") 831, such as a conventional microprocessor, and a number of other units interconnected via system bus 832. Computer 720 includes random-access memory ("RAM") 834, read-only memory ("ROM") 836, display adapter 837 for connecting system bus 832 to video display terminal 724, and I/O adapter 839 for connecting peripheral devices (e.g., disk and tape drives 833) to system bus 832. Video display terminal 724 is the visual output of computer 720, which can be a CRT-based video display well-known in the art of computer hardware. However, with a portable or notebook-based computer, video display terminal 724 can be replaced with an LCD-based or a gas plasma-based flat-panel display. Computer 720 further includes user interface adapter 1040 for connecting keyboard 726, mouse 728, speaker 846, microphone 848, and/or other user interface devices, such as a touch screen device (not shown), to system bus 832. Communications adapter 849 connects computer 720 to a data-processing network.

Any suitable machine-readable media may retain the method and system of an illustrative embodiment of the present invention, such as RAM 834, ROM 836, a magnetic diskette, magnetic tape, or optical disk (the last three being located in disk and tape drives 833). Any suitable operating system and associated graphical user interface (e.g., Microsoft Windows) may direct CPU 831. For example, the AIX operating system and AIXwindows windowing system (i.e., graphical user interface) can direct CPU 831. The AIX operating system is IBM's implementation of the UNIX operating system. UNIX is a trademark of UNIX Systems Laboratories, Inc. The RISC System/6000 system, among others, can run on the AIX operating system. Other technologies can also be utilized in conjunction with CPU 831, such as touch-screen technology or human voice control. In addition, computer 720 includes a control program 851 which resides within computer storage 850. Control program 851 contains instructions that when executed on CPU 831 carries out the operations depicted in the logic flow-charts of FIG. 6 and the partially schematic diagrams of FIGS. 1, 2, 3, 4 and 5 as described herein.

Those skilled in the art will appreciate that the hardware depicted in FIG. 8 may vary for specific applications. For example, other peripheral devices such as optical disk media, audio adapters, or chip programming devices, such as PAL or EPROM programming devices well-known in the art of computer hardware, and the like may be utilized in addition to or in place of the hardware already depicted.

As a final matter, it is important that while an illustrative embodiment of the present invention has been, and will continue to be, described in the context of a fully functional computing system, those skilled in the art will appreciate that the mechanisms of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. A method for use with wireless communications systems having a cellular architecture with a plurality of cells, said method achieving near real time reservation of channels in a first cell for call-in-progress handoffs from other cells in such a fashion that blocked calls originating within said first cell and blocked handoff of calls-in-progress from other cells are held within acceptable levels, and said method comprising the steps of:

specifying a minimum number of unutilized channels in said first cell to be reserved for servicing call-in-progress handoffs;

in response to an event in which a request for a call-in-progress handoff from one of said other cells into said first cell cannot be serviced due to a lack of unutilized channels, dynamically adjusting said specified minimum number of reserved channels upward and enqueuing said request for a call-in-progress handoff, wherein said dynamically adjusting said specified minimum number of reserved channels upward comprises adding one to said specified minimum number of reserved channels; and in response to an event in which a request for a call-in-progress handoff from one of said other cells into said first cell can be serviced without being enqueued, servicing said request for call-in-progress handoff and dynamically adjusting said specified minimum number of reserved channels downward.

2. The method of claim 1, further comprising the steps of:

in response to a request for call access from a mobile subscriber unit within said first cell, determining if a number of unutilized channels in said first cell has fallen below said specified minimum number reserved for servicing call-in-progress handoffs;

in response to a determination that said number of unutilized channels in said first cell has fallen below said specified number of unutilized channels reserved for servicing call-in-progress handoffs, enqueuing said request for call access, or blocking said request for call access, or mandating a directed retry; and in response to a determination that said number of unutilized channels in said first cell has not fallen below said specified number reserved for servicing call-in-progress handoffs, servicing said request for call access and adjusting said specified number of reserved channels downward such that a number of unutilized channels sufficient to service requests for handoff of calls-in-progress is dynamically maintained in a fashion that does not unduly restrict requests for call access from mobile subscriber units within said first cell.

3. The method of claim 1, further comprising the step of servicing, in a first in first out fashion, said enqueued requests for a call-in-progress handoff as unutilized channels become available.

4. The method of claim 2, further comprising the step of servicing, in a first in first out fashion, said enqueued requests for call access as unutilized channels become available provided that the number of unutilized channels reserved for servicing call-in-progress handoffs meets or exceeds said specified minimum number.

5. The method of claim 1, wherein said step of specifying a minimum number of unutilized channels further comprises the step of specifying a cardinal number of unutilized channels.

6. The method of claim 1, wherein said step of dynamically adjusting said specified minimum number of reserved channels downward further comprises the step of subtracting one from said minimum specified number of reserved channels.

7. An apparatus for use with wireless communications systems having a cellular architecture with a plurality of cells, said apparatus achieving near real time reservation of channels in a first cell for call-in-progress handoffs from other cells in such a fashion that blocked calls originating within said first cell and blocked handoff of calls-in-progress from other cells are held within acceptable levels, and said apparatus comprising:

means for specifying a minimum number of unutilized channels in said first cell to be reserved for servicing call-in-progress handoffs, means for dynamically adjusting said specified minimum number of reserved channels upward and enqueuing said request for a call-in-progress handoff in response to an event in which a request for a call-in-progress handoff from one of said other cells into said first cell cannot be serviced due to a lack of unutilized channels, wherein said means for dynamically adjusting said specified minimum number of reserved channels upward further comprises means for adding one to said specified minimum number of reserved channels; and means for servicing said request for call-in-progress handoff and dynamically adjusting said specified minimum number of reserved channels downward in response to an event in which a request for a call-in-progress handoff from one of said other cells into said first cell be serviced without being enqueued.

8. The apparatus of claim 7, further comprises:

means, responsive to a request for call access from a mobile subscriber unit within said first cell, for determining if a number of unutilized channels in said first cell has fallen below said specified minimum number reserved for servicing call-in-progress handoffs;

means, responsive to a determination that said number of unutilized channels in said first cell has fallen below said specified number of unutilized channels reserved for servicing call-in-progress handoffs, for enqueuing said request for call access, or blocking said request for call access, or mandating a directed retry; and means, responsive to a determination that said number of unutilized channels in said first cell has not fallen below said specified number reserved for servicing call-in-progress handoffs, for servicing said request for call access and adjusting said specified number of reserved channels downward such that a number of unutilized channels sufficient to service requests for handoff of calls-in-progress is dynamically maintained in a fashion that does not unduly restrict requests for call access from mobile subscriber units within said first cell.

9. The apparatus of claim 7, further comprising means for servicing, in a first in first out fashion, said enqueued requests for a call-in-progress handoff as unutilized channels become available.

10. The apparatus of claim 9, further comprising means for servicing, in a first in first out fashion, said enqueued requests for call access as unutilized channels become available provided that the number of unutilized channels reserved for servicing call-in-progress handoffs meets or exceeds said specified minimum number.

11. The apparatus of claim 7, wherein said means for specifying a minimum number of unutilized channels further comprises means for specifying a cardinal number of unutilized channels.

12. The apparatus of claim 7, wherein said means for dynamically adjusting said specified minimum number of reserved channels downward further comprises means for subtracting one from said minimum specified number of reserved channels.

13. An program product for use with wireless communications systems having a cellular architecture with a plurality of cells, said program product achieving near real time reservation of channels in a first cell for call-in-progress handoffs from other cells in such a fashion that blocked calls originating within said first cell and blocked handoff of calls-in-progress from other cells are held within acceptable levels, and said program product comprising:

means for specifying a minimum number of unutilized channels in said first cell to be reserved for servicing call-in-progress handoffs;

means for dynamically adjusting said specified minimum number of reserved channels upward and enqueuing said request for a call-in-progress handoff in response to an event in which a request for a call-in-progress handoff from one of said other cells into said first cell cannot be serviced due to a lack of unutilized channels, wherein said means for dynamically adjusting said specified minimum number of reserved channels upward comprises means for adding one to said specified minimum number of reserved channels;

means for servicing said request for call-in-progress handoff and dynamically adjusting said specified minimum number of reserved channels downward in response to an event in which a request for a call-in-progress handoff from one of said other cells into said first cell can be serviced without being enqueued; and signal bearing means bearing said means for specifying, said means for dynamically adjusting said specified minimum number of reserved channels upward, and said means for servicing said request for call-in-progress handoff.

14. The program product of claim 13, further comprises:

means, responsive to a request for call access from a mobile subscriber unit within said first cell, for determining if a number of unutilized channels in said first cell has fallen below said specified minimum number reserved for servicing call-in-progress handoffs;

means, responsive to a determination that said number of unutilized channels in said first cell has fallen below said specified number of unutilized channels reserved for servicing call-in-progress handoffs, for enqueuing said request for call access, or blocking said request for call access, or mandating a directed retry;

means, responsive to a determination that said number of unutilized channels in said first cell has not fallen below said specified number reserved for servicing call-in-progress handoffs, for servicing said request for call access and adjusting said specified number of reserved channels downward such that a number of unutilized channels sufficient to service requests for handoff of calls-in-progress is dynamically maintained in a fashion that does not unduly restrict requests for call access from mobile subscriber units within said first cell; and signal bearing means bearing said means for determining if a number of unutilized channels in said first cell has fallen below said specified minimum number, said means for enqueuing said request for call access, and said means for servicing said request for call access.

15. The program product of claim 13 wherein said signal bearing means further comprises recordable media.

16. The program product of claim 13 wherein said signal bearing means further comprises transmission media.

17. The program product of claim 14 wherein said signal bearing means further comprises recordable media.

18. The program product of claim 14 wherein said signal bearing means further comprises transmission media.

19. The program product of claim 13, further comprising means for servicing, in a first in first out fashion, said enqueued requests for a call-in-progress handoff as unutilized channels become available.

20. The program product of claim 14, further comprising means for servicing, in a first in first out fashion, said enqueued requests for call access as unutilized channels become available provided that the number of unutilized channels reserved for servicing call-in-progress handoffs meets or exceeds said specified minimum number.

21. The program product of claim 13, wherein said means for specifying a minimum number of unutilized channels further comprises means for specifying a cardinal number of unutilized channels.

22. The program product of claim 13, wherein said means for dynamically adjusting said specified minimum number of reserved channels downward further comprises means for subtracting one from said minimum specified number of reserved channels.

* * * * *

UNITED STATES PATENT AND TRADEMARK OFFICE
CERTIFICATE OF CORRECTION

PATENT NO.      : 6,181,941 B1
DATED           : January 30, 2001
INVENTOR(S)     : Michael J. McCarthy Page 1 of 1

It is certified that error appears in the above-identified patent and that said Letters Patent is hereby corrected as shown below:

<u>Column 16,</u>
Line 39, please insert -- can -- after the word "cell."

Signed and Sealed this

Twenty-ninth Day of January, 2002

Attest:

Attesting Officer

JAMES E. ROGAN
*Director of the United States Patent and Trademark Office*